(12) United States Patent
Adams et al.

(10) Patent No.: US 10,089,468 B2
(45) Date of Patent: *Oct. 2, 2018

(54) DETECTING KEYLOGGING

(71) Applicant: Juniper Networks, Inc., Sunnyvale, CA (US)

(72) Inventors: Kyle Adams, Brisbane, CA (US); Jacob Asher Langton, Oakland, CA (US); Daniel J. Quinlan, San Francisco, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 15/620,350

(22) Filed: Jun. 12, 2017

(65) Prior Publication Data

US 2017/0344744 A1 Nov. 30, 2017

Related U.S. Application Data

(63) Continuation of application No. 14/674,426, filed on Mar. 31, 2015, now Pat. No. 9,679,141.

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |
| G06F 21/51 | (2013.01) |

(Continued)

(52) U.S. Cl.
CPC ............ *G06F 21/568* (2013.01); *G06F 21/51* (2013.01); *G06F 21/554* (2013.01); *G06F 21/566* (2013.01); *G06F 21/567* (2013.01); *G06F 21/83* (2013.01); *G06F 2221/034* (2013.01)

(58) Field of Classification Search
None
See application file for complete search history.

(56) References Cited

U.S. PATENT DOCUMENTS

| | | |
|---|---|---|
| 7,818,800 B1 | 10/2010 | Lemley |
| 7,908,652 B1 | 3/2011 | Austin |

(Continued)

FOREIGN PATENT DOCUMENTS

WO WO 2007/0106609 A2 9/2007

OTHER PUBLICATIONS

Extended European Search Report corresponding to EP15178611.8, dated Aug. 5, 2016, 6 pages.

*Primary Examiner* — Morshed Mehedi
*Assistant Examiner* — Vadim Savenkov
(74) *Attorney, Agent, or Firm* — Harrity & Harrity, LLP

(57) ABSTRACT

A device may detect or emulate a sequence of keystrokes to be used to detect a keystroke logger application. The device may determine a sequence of characters associated with the sequence of keystrokes. The sequence of characters may correspond to the sequence of keystrokes or a portion of the sequence of keystrokes. The device may search a memory for the sequence of characters. The device may determine that the sequence of characters is stored in the memory based on searching the memory for the sequence of characters. The device may perform an action to counteract the keystroke logger application based on determining that the sequence of characters is stored in the memory.

20 Claims, 11 Drawing Sheets

(51) Int. Cl.
*G06F 21/55* (2013.01)
*G06F 21/83* (2013.01)

(56) References Cited

U.S. PATENT DOCUMENTS

| | | | |
|---|---|---|---|
| 8,528,091 B2 * | 9/2013 | Bowen | G06F 21/566 |
| | | | 713/168 |
| 8,707,437 B1 | 4/2014 | Ming-Chang | |
| 9,197,628 B1 * | 11/2015 | Hastings | H04L 63/0254 |
| 9,679,141 B2 | 6/2017 | Adams et al. | |
| 2006/0143708 A1 | 6/2006 | Garvey et al. | |
| 2007/0169191 A1 | 7/2007 | Greene | |
| 2008/0301051 A1 | 12/2008 | Stahlberg | |
| 2009/0241187 A1 | 9/2009 | Troyansky | |
| 2010/0058479 A1 | 3/2010 | Chen | |
| 2011/0219457 A1 | 9/2011 | Keshet | |
| 2012/0110174 A1 | 5/2012 | Wootton | |
| 2013/0298254 A1 * | 11/2013 | Thomas Hall | H04L 43/028 |
| | | | 726/26 |
| 2014/0026217 A1 | 1/2014 | Saxena | |
| 2014/0237545 A1 | 8/2014 | Mylavarapu | |

* cited by examiner

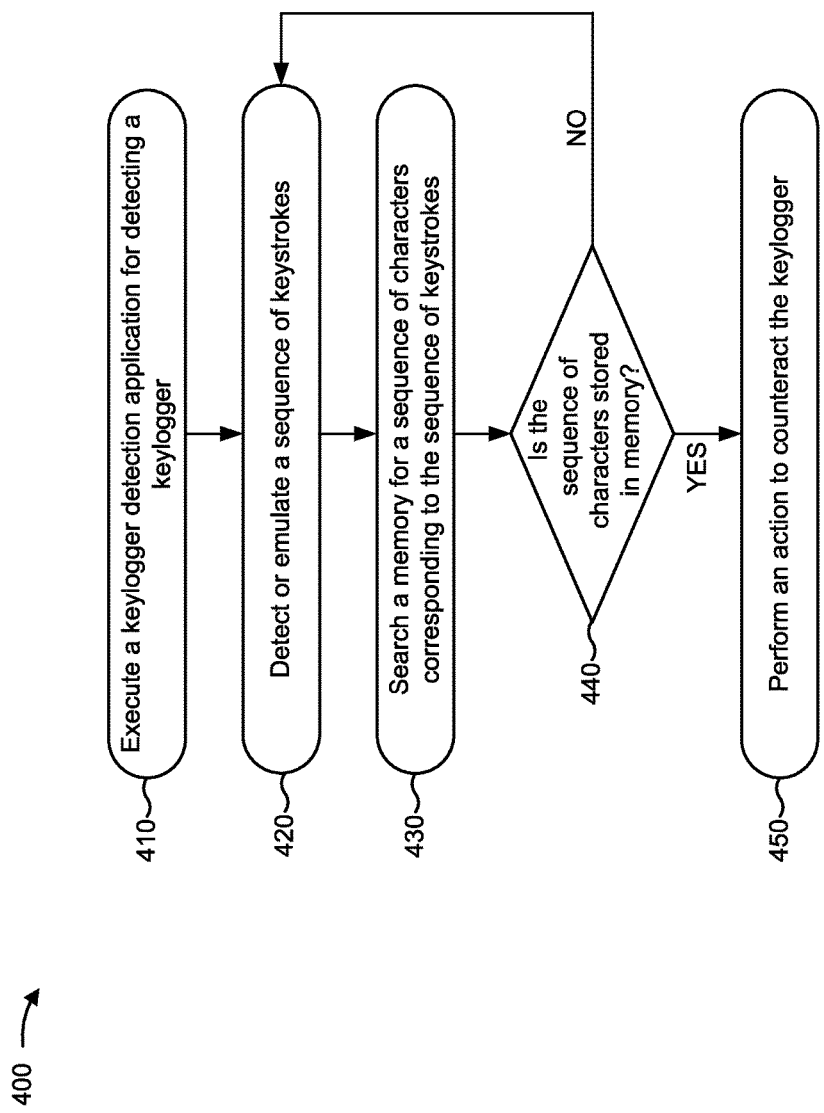

DETECTING KEYLOGGING

RELATED APPLICATION

This application is a continuation of U.S. patent application Ser. No. 14/674,426, filed Mar. 31, 2015 (now U.S. Pat. No. 9,679,141), which is incorporated herein by reference.

BACKGROUND

Keylogging, short for keystroke logging, may refer to the action of logging (e.g., monitoring, recording, etc.) the keys struck on a keyboard or input to a computer, typically in a covert manner so that a user using the keyboard is unaware that the user's actions are being logged. Keylogging may be performed by a keylogger, which may refer to an application that logs keystrokes. A keylogger may be used maliciously, such as to steal confidential information, learn a user's login credentials (e.g., a username and/or password), steal credit card information, or the like.

SUMMARY

According to some possible implementations, a device may detect or emulate a sequence of keystrokes to be used to detect a keystroke logger application. The device may determine a sequence of characters associated with the sequence of keystrokes. The sequence of characters may correspond to the sequence of keystrokes or a portion of the sequence of keystrokes. The device may search a memory for the sequence of characters. The device may determine that the sequence of characters is stored in the memory based on searching the memory for the sequence of characters. The device may perform an action to counteract the keystroke logger application based on determining that the sequence of characters is stored in the memory.

According to some possible implementations, a computer-readable medium may store one or more instructions that, when executed by one or more processors, cause the one or more processors to execute a keylogger detection application for detecting a keystroke logger application. The one or more instructions may cause the one or more processors to detect or emulate, using the keylogger detection application, a sequence of keystrokes. The one or more instructions may cause the one or more processors to identify a sequence of characters associated with the sequence of keystrokes. The sequence of characters may correspond to the sequence of keystrokes or a portion of the sequence of keystrokes. The one or more instructions may cause the one or more processors to search a memory for the sequence of characters. The one or more instructions may cause the one or more processors to determine that the sequence of characters is stored in the memory based on searching the memory for the sequence of characters. The one or more instructions may cause the one or more processors to perform an action to counteract the keystroke logger application based on determining that the sequence of characters is stored in the memory.

According to some possible implementations, a method may include detecting or emulating, by a device, a sequence of keystrokes to be used to detect a keystroke logger application. The method may include determining, by the device, a sequence of characters associated with the sequence of keystrokes. The sequence of characters may correspond to the sequence of keystrokes or a portion of the sequence of keystrokes. The method may include searching, by the device, a memory for the sequence of characters. The method may include determining, by the device, that the sequence of characters is stored in the memory based on searching the memory for the sequence of characters. The method may include performing, by the device, an action to counteract the keystroke logger application based on determining that the sequence of characters is stored in the memory.

BRIEF DESCRIPTION OF THE DRAWINGS

FIG. 4 is a flow chart of an example process for detecting keylogging;

DETAILED DESCRIPTION

The following detailed description of example implementations refers to the accompanying drawings. The same reference numbers in different drawings may identify the same or similar elements.

A keylogger may refer to an application that logs a user's keystrokes input via a keyboard or another input component. A keylogger may be used maliciously, such as to steal confidential or sensitive information associated with the user. For example, a keylogger may be used to determine a user's login credentials (e.g., a username and/or password), credit card information, bank account information, email address, residential address, phone number, or the like. A keylogger detection application may refer to an application that attempts to detect a keylogger.

A keylogger may log (e.g., monitor and/or record) keystrokes associated with a client device (e.g., a personal computer, etc.), and may send information that identifies the logged keystrokes to a device associated with a malicious user (e.g., a command and control server). Some keylogger detection applications may attempt to detect keyloggers by monitoring communications from the client device. However, a keylogger may encrypt outgoing communications, making it difficult to detect the keylogger by monitoring these communications. Some keylogger detection applications may attempt to detect keyloggers by comparing files stored by the client device to a list of known keyloggers or information associated with known keyloggers (e.g., a keylogger signature, a keylogger data structure, etc.). However, this requires that the keylogger or the information associated with the keylogger is already known. Implementations described herein may be used to detect a keylogger without monitoring network communications, and with little or no prior information about the keylogger.

Figure 1:
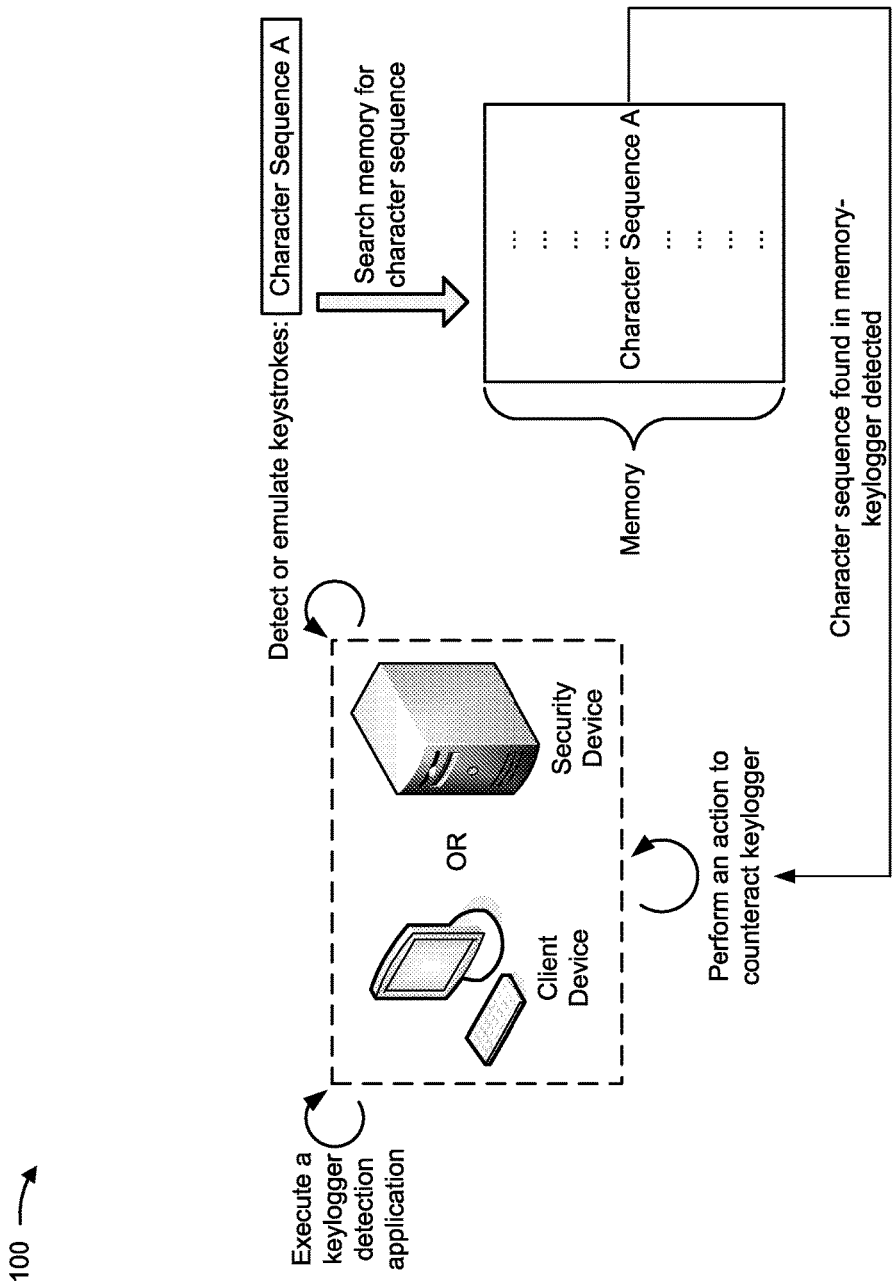
FIG. 1 is a diagram of an overview of an example implementation described herein.

FIG. 1 is a diagram of an overview of an example implementation 100 described herein. As shown in FIG. 1, a client device (e.g., a computer or the like) or a security device (e.g., a firewall, a router, etc.) may execute a keylogger detection application to monitor for a keylogger. As described in more detail elsewhere herein, the keylogger detection application may execute on the client device to detect a keylogger executing on the client device, and/or the keylogger detection application may execute on the security device that protects the client device from downloading or executing a keylogger.

As further shown in FIG. 1, the client device or the security device may detect keystrokes input by a user, or may emulate keystrokes (e.g., without user input). In some implementations, the client device or the security device may emulate keystrokes in a particular manner, as described in more detail elsewhere herein. As shown, assume that the client device or the security device detects or emulates a character sequence shown as "Character Sequence A." The client device or the security device may then search a memory for this character sequence (e.g., a memory associated with an application being executed). If the character sequence is found in memory, this may indicate that the keystrokes are being logged by a keylogger. In this case, and as shown, the client device or the security device may perform an action to counteract the keylogger, as described in more detail elsewhere herein.

In this way, the client device or the security device may detect a keylogger without monitoring network communications associated with the keylogger, which may be encrypted to avoid detection. Furthermore, the client device or the security device may detect a keylogger with no prior information about the keylogger, such as a file associated with the keylogger, a signature associated with the keylogger, a data structure associated with the keylogger, or the like. This may conserve computing resources that would otherwise be used ineffectually to detect keyloggers by monitoring network communications or storing prior information about the keyloggers, and may increase the effectiveness of keylogger detection.

Figure 2:
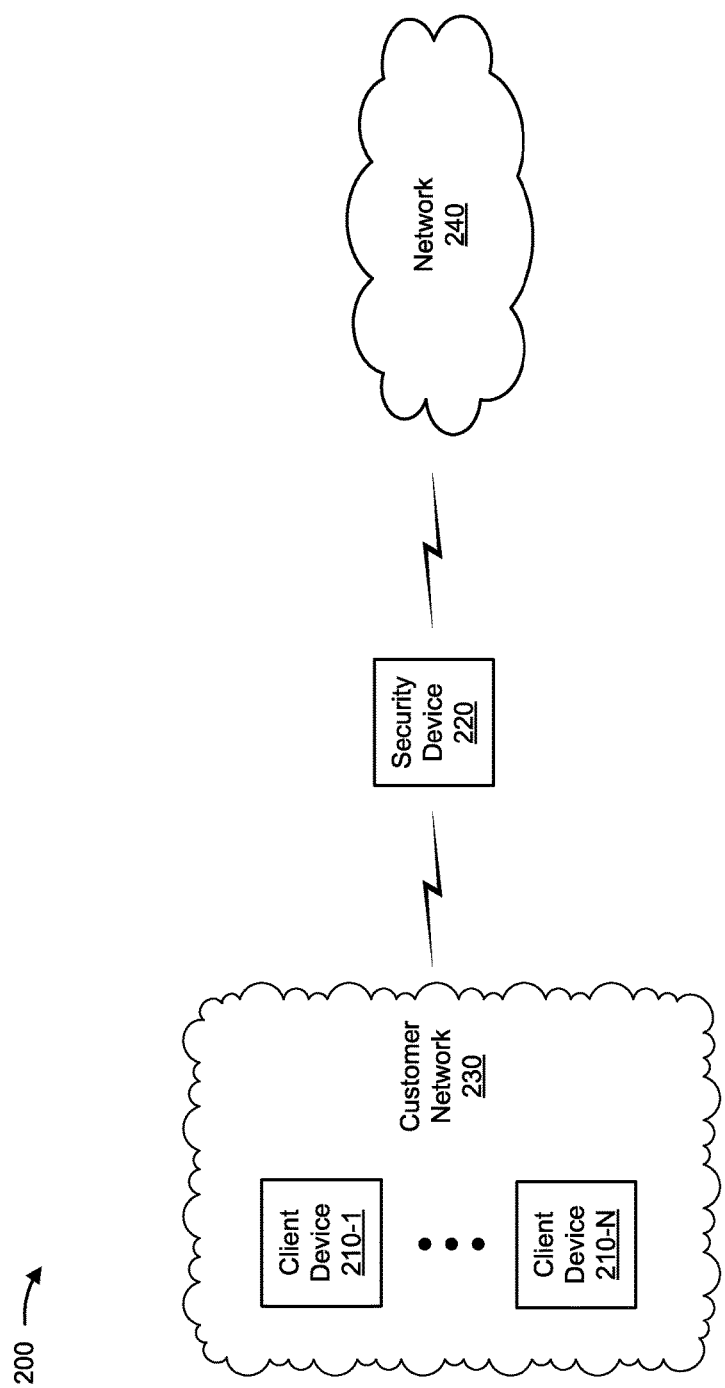
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), a security device 220, a customer network 230, and a network 240. Devices of environment 200 may interconnect via wired connections, wireless connections, or a combination of wired and wireless connections.

Client device 210 may include one or more devices capable of executing a keylogger and/or a keylogger detection application. For example, client device 210 may include a desktop computer, a laptop computer, a tablet computer, a mobile phone (e.g., a smart phone, a radiotelephone, etc.), a server, or a similar type of device. In some implementations, client device 210 may be associated with an input component, such as a keyboard, a microphone, or the like, that permits a user to input information (e.g., via keystrokes, via voice input that may be translated to keystrokes, etc.). In some implementations, the keystrokes may be logged by a keylogger executing on client device 210, and the keylogger detection application may be executed by client device 210 to detect the keylogger. In some implementations, client device 210 may reside on customer network 230.

Security device 220 may include one or more devices capable of processing and/or transferring network traffic associated with client device 210, and/or capable of providing a security service (e.g., a keylogger detection service) for client device 210 and/or customer network 230. For example, security device 220 may include a gateway, a firewall, a router, a bridge, a hub, a switch, a load balancer, a reverse proxy, a server (e.g., a proxy server), or a similar type of device. Security device 220 may be used in connection with a single client device 210 or a group of client devices 210 (e.g., client devices 210 associated with a private network, a data center, etc.). In some implementations, communications may be routed through security device 220 to reach the group of client devices 210. For example, security device 220 may be positioned within a network as a gateway to customer network 230 that includes the group of client devices 210. Additionally, or alternatively, communications from client devices 210 may be encoded such that the communications are routed to security device 220 before being routed elsewhere.

In some implementations, security device 220 may execute a keylogger detection application to detect a keylogger. For example, security device 220 may monitor a file requested by and/or provided to client device 210 (e.g., before the file is provided to client device 210, after the file is provided to client device 210, etc.) to detect whether the file is a keylogger. In some implementations, security device 220 may execute the file in a sandbox environment, and may execute the keylogger detection algorithm in the sandbox environment to detect whether the file is a keylogger.

Customer network 230 may include one or more wired and/or wireless networks. For example, customer network 230 may include a local area network (LAN), a private network, an intranet, a cloud computing network, a cellular network (e.g., a long-term evolution (LTE) network, a 3G network, a code division multiple access (CDMA) network, etc.), a public land mobile network (PLMN), a wide area network (WAN), a metropolitan area network (MAN), a telephone network (e.g., the Public Switched Telephone Network (PSTN)), an ad hoc network, the Internet, a fiber optic-based network, or the like, and/or a combination of these or other types of networks. In some implementations, customer network 230 may be a private network associated with client devices 210.

Network 240 may include one or more wired and/or wireless networks. For example, network 240 may include a cellular network, a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks. In some implementations, security device 220 may monitor a file, requested by client device 210 from a device (e.g., a server) associated with network 240, to detect whether the file is a keylogger.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
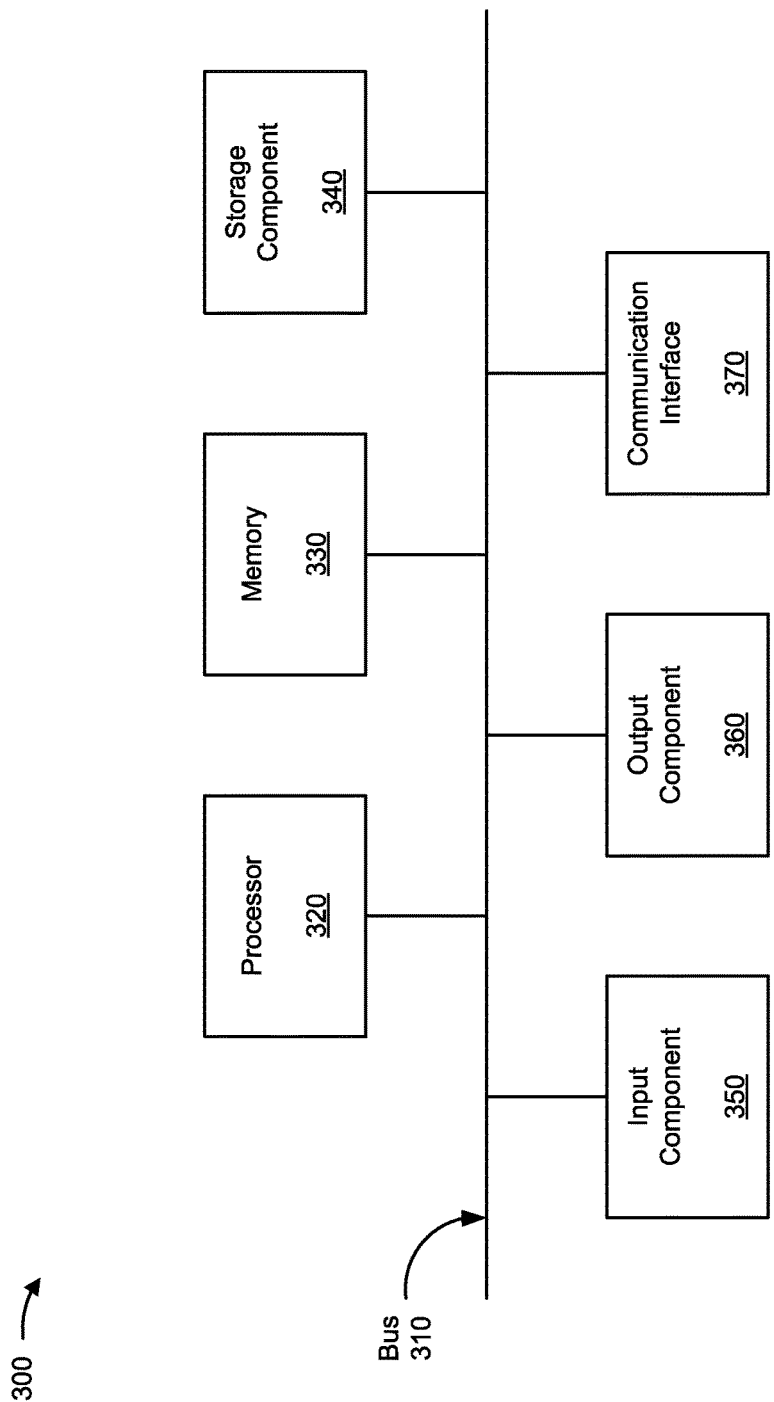
FIG. 3 is a diagram of example components of one or more devices of FIG. 2.

FIG. 3 is a diagram of example components of a device 300. Device 300 may correspond to client device 210 and/or security device 220. In some implementations, client device 210 and/or security device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for detecting keylogging. In some implementations, one or more process blocks of FIG. 4 may be performed by client device 210 and/or security device 220. In some implementations, one or more process blocks of FIG. 4 may be performed by another device or a set of devices separate from or including client device 210 and/or security device 220.

As shown in FIG. 4, process 400 may include executing a keylogger detection application for detecting a keylogger (block 410). In some implementations, client device 210 may execute the keylogger detection application to detect a keylogger (e.g., a keystroke logger application that logs keystrokes). For example, client device 210 may execute the keylogger detection application on client device 210 to detect a keylogger that is also executing on client device 210. Additionally, or alternatively, security device 220 may execute the keylogger detection application to detect a keylogger. For example, security device 220 may receive a file associated with client device 210 (e.g., a file stored by client device 210, a file executing on client device 210, a file requested by client device 210, etc.), may execute the file, and may execute the keylogger detection application to detect whether the file is a keylogger.

While some implementations are described herein as being performed by client device 210, these implementations may be performed by security device 220. Likewise, implementations described herein as being performed by security device 220 may be performed by client device 210 in some implementations.

As further shown in FIG. 4, process 400 may include detecting or emulating a sequence of keystrokes (block 420). For example, client device 210 may detect a sequence of keystrokes. The sequence of keystrokes may be input to client device 210 using a keystroke input component, such as a keyboard (e.g., a physical keyboard, a touch screen keyboard, a keypad, a keyboard application executing on client device 210, or the like), a voice input component (e.g., a microphone) that permits input of keystrokes based on voice commands, or the like. For example, the user may input keystrokes using the keyboard, the keyboard may send information that identifies the keystrokes to client device 210, and client device 210 may detect the sequence of keystrokes based on the information received from the keyboard. Client device 210 may record (e.g., may store) the sequence of keystrokes, such that the sequence of keystrokes may be used to detect a keylogger, as described below. As used herein, a sequence of keystrokes may refer to a particular combination of keystrokes (e.g., one or more keystrokes input and/or received in a particular order).

Additionally, or alternatively, client device 210 may emulate a sequence of keystrokes. For example, rather than detecting input received from a keystroke input component, client device 210 may emulate and/or generate a sequence of keystrokes (e.g., not received via a keystroke input component, without user input, etc.). Client device 210 may emulate the sequence of keystrokes in a manner that would cause a keylogger to log the sequence of keystrokes. For example, client device 210 may emulate the sequence of keystrokes in a manner that imitates a manner of inputting the sequence of keystrokes using a keystroke input component. In some implementations, client device 210 may periodically emulate a sequence of keystrokes (e.g., the same sequence of keystrokes, a different sequence of keystrokes, etc.), such as every minute, every five minutes, every ten minutes, every hour, etc.

In some implementations, client device 210 may determine that client device 210 is idle before emulating the sequence of keystrokes. For example, client device 210 may determine that a threshold amount of time has passed since user input has been provided to client device 210. Based on determining that the threshold amount of time has passed, client device 210 may emulate the sequence of keystrokes. In this way, client device 210 may avoid interrupting the user's activity by emulating keystrokes while the user is using client device 210.

Additionally, or alternatively, client device 210 may focus on a particular user interface of client device 210 (e.g., a particular window, a user interface associated with a particular application, or the like) before emulating the sequence of keystrokes. Focusing on a user interface may refer to selecting that user interface to receive input (e.g., the emulated sequence of keystrokes). As an example, client device 210 may select a dummy user interface (e.g., associated with the keylogger detection application) to receive the input of the emulated sequence of keystrokes. In this case, client device 210 may open and/or focus on the dummy user interface, may emulate the sequence of keystrokes, and may close and/or switch focus away from the dummy user interface after emulating the sequence of keystrokes. In this way, other applications of client device 210 may not be impacted by receiving the input of the emulated sequence of keystrokes.

As another example, client device 210 may select a user interface of a desktop environment (e.g., a Microsoft Windows desktop environment, an Apple Mac desktop environment, a Linux desktop environment, etc.) to receive focus for the input of the emulated sequence of keystrokes. In some implementations, client device 210 may determine a first user interface that has focus before emulating the sequence of keystrokes, may switch focus to a second user interface, may emulate the sequence of keystrokes with the focus on the second user interface, and may switch focus back to the first user interface after emulating the sequence of keystrokes. In this way, client device 210 may minimize an impact of the sequence of keystrokes on applications executing on client device 210.

In some implementations, client device 210 may select a user interface of a web browser to receive focus for the input of the emulated sequence of keystrokes. Additionally, or alternatively, client device 210 may navigate to a particular website before emulating the sequence of keystrokes (e.g., a real website of a company, a dummy website created to detect keystroke logging, etc.). For example, client device 210 may navigate to a website of a bank, a credit card company, a retail company, a shopping cart (e.g., a checkout webpage) of a website, or the like. Some keyloggers may only execute and/or log keystrokes when the focus is on a web browser, or when the web browser loads a particular website, such that the keylogger is only monitoring keystrokes when the user is likely to input sensitive information (e.g., a user name, a password, an email address, bank account information, credit card information, or the like). By opening (e.g., launching) and/or focusing on a web browser (or another application associated with sensitive user information), and/or by navigating or focusing on a particular website (e.g., a website associated with sensitive user information), client device 210 may trigger the keylogger, thereby increasing the likelihood that client device 210 detects the keylogger.

Additionally, or alternatively, client device 210 may emulate a sequence of keystrokes based on a pattern of characters. The pattern of characters may be designed to trigger the keylogger to log the sequence of keystrokes (e.g., the pattern of character may be a pattern of characters that is likely to trigger keylogging). For example, client device 210 may emulate the sequence of keystrokes based on a pattern of characters associated with a credit card number (e.g., 16 digits, 15 digits, etc.), a pattern of characters associated with a credit card expiration date (e.g., two digits representing a month, followed by two or four digits representing a year, etc.), a pattern of characters associated with a bank account (e.g., a particular number of digits associated with a bank routing number, a particular number of digits associated with a bank account number, etc.), a pattern of characters associated with a username and password (e.g., a particular length of the sequence of characters, such as between 8 and 15 characters, a particular combination of character types, such as a sequence of characters between 8 and 20 characters that includes an uppercase letter, a lowercase letter, a number, and a special character, etc.), a pattern of characters associated with an email address (e.g., a particular number of characters, followed by an at sign (@), followed by more characters, followed by a period (.), followed by three characters, etc.), a pattern of characters associated with a personal identification number (e.g., a four digit PIN), a pattern of characters associated with a phone number (e.g., ten digits, eleven digits, etc.), or the like. In some implementations, client device 210 may identify a pattern of characters, and may emulate the sequence of keystrokes based on the pattern of characters. In this way, client device 210 may increase the likelihood of triggering keylogging, thereby increasing the likelihood that client device 210 detects the keylogger.

While some implementations are described above as being performed by client device 210, these implementations may be performed by security device 220, in some implementations.

As further shown in FIG. 4, process 400 may include searching a memory for a sequence of characters corresponding to the sequence of keystrokes (block 430). For example, client device 210 may search a memory (e.g., memory 330, storage component 340, or the like), of client device 210 for a sequence of characters corresponding to the sequence of keystrokes. In some implementations, the keylogger detection application may store a sequence of characters corresponding to the detected or emulated sequence of characters, so that client device 210 may search the memory using the sequence of characters. In this case, client device 210 may record a memory location where the sequence of characters are stored by the keylogger detection application, and may search memory locations other than this memory location. In this way, client device 210 may avoid a false positive search result due to the sequence of characters being stored by the keylogger detection application. Additionally, or alternatively, client device 210 may search the memory, and may determine whether the sequence of characters is stored twice in memory (e.g., once by the keylogger application and once by the keylogger detection application for the purpose of detecting the keylogger application).

In some implementations, client device 210 may search all memory locations of client device 210. In some implementations, client device 210 may search a memory location associated with one or more applications (e.g., processes, threads, etc.) being executed by client device 210. Additionally, or alternatively, client device 210 may search a memory location associated with one or more applications that have been executed by client device 210 within a threshold time period (e.g., the past 10 minutes, the past 30 minutes, the past hour, the past day, etc.). In some implementations, a memory location may be associated with an application when the application uses and/or reserves the memory location to store information associated with the application. By searching memory locations associated with an executing application or an application that has been recently executed (e.g., within a threshold time period of the current time), client device 210 may save computing resources by searching fewer memory locations than if all memory locations were searched.

In some implementations, client device 210 may search for a sequence of characters corresponding to the entire sequence of keystrokes detected or emulated by client device 210. In some implementations, client device 210 may search for a sequence of characters corresponding to a portion (e.g., less than all) of the sequence of keystrokes detected or emulated by client device 210. In some implementations, client device 210 may search a contiguous portion of memory (e.g., contiguous memory locations) for the sequence of characters. In some implementations, client device 210 may search a non-contiguous portion of memory (e.g., non-contiguous memory locations) for the sequence of characters.

In some implementations, client device 210 may modify the sequence of characters, and may search for the modified sequence of characters in a manner as described herein with respect to searching for the sequence of characters. For example, client device 210 may insert one or more characters in one or more locations of the sequence of characters (e.g., transforming user to u.s.e.r, or the like), may apply an obfuscation technique to the sequence of characters (e.g., by applying a ROT-13 substitution technique, by XORing one or more characters with a particular byte, etc.), by converting from one character encoding scheme to another character encoding scheme (e.g., by converting from ASCII to UTF-8, etc.), or the like.

Additionally, or alternatively, client device 210 may search for a sequence of characters in outbound network traffic (e.g., in a single packet, spread across multiple packets, etc.) in a similar manner as described herein with respect to searching for the sequence of characters in a memory. Additionally, or alternatively, client device 210 may search for a sequence of characters in a file (e.g., in a single file, spread across multiple files, etc.) in a similar manner as described herein with respect to searching for the sequence of characters in a memory.

While some implementations are described above as being performed by client device 210, these implementations may be performed by security device 220, in some implementations.

As further shown in FIG. 4, process 400 may include determining whether the sequence of characters is stored in the memory (block 440). For example, client device 210 may determine whether the sequence of characters stored in memory matches the sequence of characters corresponding to the sequence of keystrokes (e.g., the entire sequence of keystrokes or a portion of the sequence of keystrokes). In some implementations, client device 210 may determine whether a threshold quantity of the sequence of characters stored in memory (e.g., five or more characters, at least four characters, more than six characters, etc.) matches the sequence of characters corresponding to the sequence of keystrokes. In this way, client device 210 may reduce false positive results (e.g., when only a single character matches, when a sequence of two characters matches, etc.).

Additionally, or alternatively, client device 210 may monitor timing of changes to memory after detecting and/or emulating one or more keystrokes of the sequence of keystrokes to detect whether keylogging occurs. For example, if one or more delays between keystrokes correspond to one or more delays between memory writes (e.g., within a threshold delay difference), then client device 210 may determine that keylogging has occurred.

Additionally, or alternatively, client device 210 may monitor an amount of memory that is written to after detecting and/or emulating one or more keystrokes of the sequence of keystrokes. For example, if one or more memory writes, that satisfy a threshold size, are detected in relation to one or more keystrokes, client device 210 may determine that keylogging has occurred. Additionally, or alternatively, client device 210 may monitor processing activity (e.g., CPU activity) after detecting and/or emulating one or more keystrokes of the sequence of keystrokes. For example, if one or more processing activities are detected in relation to one or more keystrokes, client device 210 may determine that keylogging has occurred.

As further shown in FIG. 4, if the sequence of characters is not stored in the memory (block 440—NO), then process 400 may include returning to block 420. For example, if client device 210 determines that the sequence of characters is not stored in memory, then client device 210 may continue processing as described above in connection with block 420 and/or block 430. For example, client device 210 may detect or emulate a new sequence of keystrokes, and may search the memory for a new sequence of characters corresponding to the new sequence of keystrokes. Additionally, or alternatively, client device 210 may continue to search the memory for the old sequence of characters. In some implementations, client device 210 may stop searching the memory for a particular sequence of characters after a threshold amount of time has passed, after a threshold quantity of searches have been performed (e.g., after searching all applicable memory locations a threshold quantity of times), or the like. Additionally, or alternatively, client device 210 may search the memory for multiple sequences of characters (e.g., a first sequence of characters corresponding to a first sequence of keystrokes, a second sequence of characters corresponding to a portion of the first sequence of keystrokes, a third sequence of characters corresponding to a second sequence of keystrokes, etc.).

While some implementations are described as being performed by client device 210, these implementations may be performed by security device 220, in some implementations.

As further shown in FIG. 4, if the sequence of characters is stored in the memory (block 440—YES), then process 400 may include performing an action to counteract the keylogger (block 450). For example, if client device 210 determines that the sequence of characters is stored in memory, then client device 210 may determine that a keylogger is logging keystrokes, and may perform an action to counteract the keylogger. As an example, if client device 210 determines that a keylogger is logging keystrokes, client device 210 may identify the keylogger and may delete the keylogger (e.g., may delete a file used to execute the keylogger). As another example, client device 210 may prevent the keylogger from sending messages to another device (e.g., a command and control server). In this way, client device 210 may disable the keylogger and may improve security of client device 210.

As another example, client device 210 may delete the stored sequence of characters from memory (e.g., the sequence of characters identified based on the search). This way, the keylogger will be unable to access the stored sequence of characters for transmission to another device. As another example, client device 210 may replace a first sequence of characters, stored in memory, with a second sequence of characters (e.g., a dummy sequence of characters, a randomly generated sequence of characters, which may include the same quantity of characters, or the like). In this case, the keylogger may send the second sequence of characters to another device (e.g., a command and control server). This way, client device 210 may prevent malicious activity, since the second sequence of characters does not correspond to an input sequence of keystrokes. Further, the keylogger may continue to operate without detecting that the keylogger has been compromised.

As another example, assume that client device 210 requests a file from a device associated with network 240 (e.g., a web server, a host server, etc.). In this case, security device 220 may receive the request, may request the file from the device, may receive the file from the device, and may detect whether the file is a keylogger before sending the file to client device 210. If security device 220 determines that the file is a keylogger (e.g., based on performing one or more of the operations described in connection with blocks 410-440), security device 220 may prevent the file from being provided to client device 210. If security device 220 determines that the file is not a keylogger, then security device 220 may provide the file to client device 210.

In some implementations, if security device 220 determines that the file is a keylogger, then security device 220 may monitor the keylogger (e.g., may monitor communications sent by the keylogger) to identify a device to which logged keystrokes are being sent (e.g., to identify a command and control server). In this case, security device 220 may block communications associated with the device, may provide an instruction to client device 210 and/or another device associated with customer network 230 (e.g., a firewall, a router, a gateway, etc.) to block communications associated with the device (e.g., to block communications to and/or from the device). Additionally, or alternatively, security device 220 may provide a notification that identifies client devices 210 that are communicating with the device (e.g., the command and control server) to identify and protect these client devices 210. In this way, security device 220 may protect client devices 210, of customer network 230, from security threats.

While some implementations are described herein as being performed by client device 210, these implementations may be performed by security device 220, in some implementations. By implementing process 400 on security device 220 to protect client devices 210, computing resources of client devices 210 may be conserved. Furthermore, implementations described herein as being performed by security device 220 may be performed by client device 210, in some implementations. By implementing process 400 on client device 210, individual protection may be provided on client device 210 against keylogging.

In this way, client device 210 and/or security device 220 may detect a keylogger without needing to monitor network communications associated with the keylogger, which may be encrypted, or may be sent to a central server infrequently, making detection difficult (e.g., making it difficult or impossible to search for the sequence of characters in an encrypted communication). Furthermore, client device 210 and/or security device 220 may detect a keylogger before communications are sent to a central server, and may counteract the keylogger before logged keystrokes are sent to the central server. Furthermore, client device 210 and/or security device 220 may detect a keylogger without needing to store keylogger-specific information, such as information that identifies a keylogger, a keylogger signature, a keylogger data structure, or the like. In this way, client device 210 and/or security device 220 may improve the technical field of keylogger detection, and may conserve computing resources that would otherwise be used to detect keyloggers according to other techniques.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
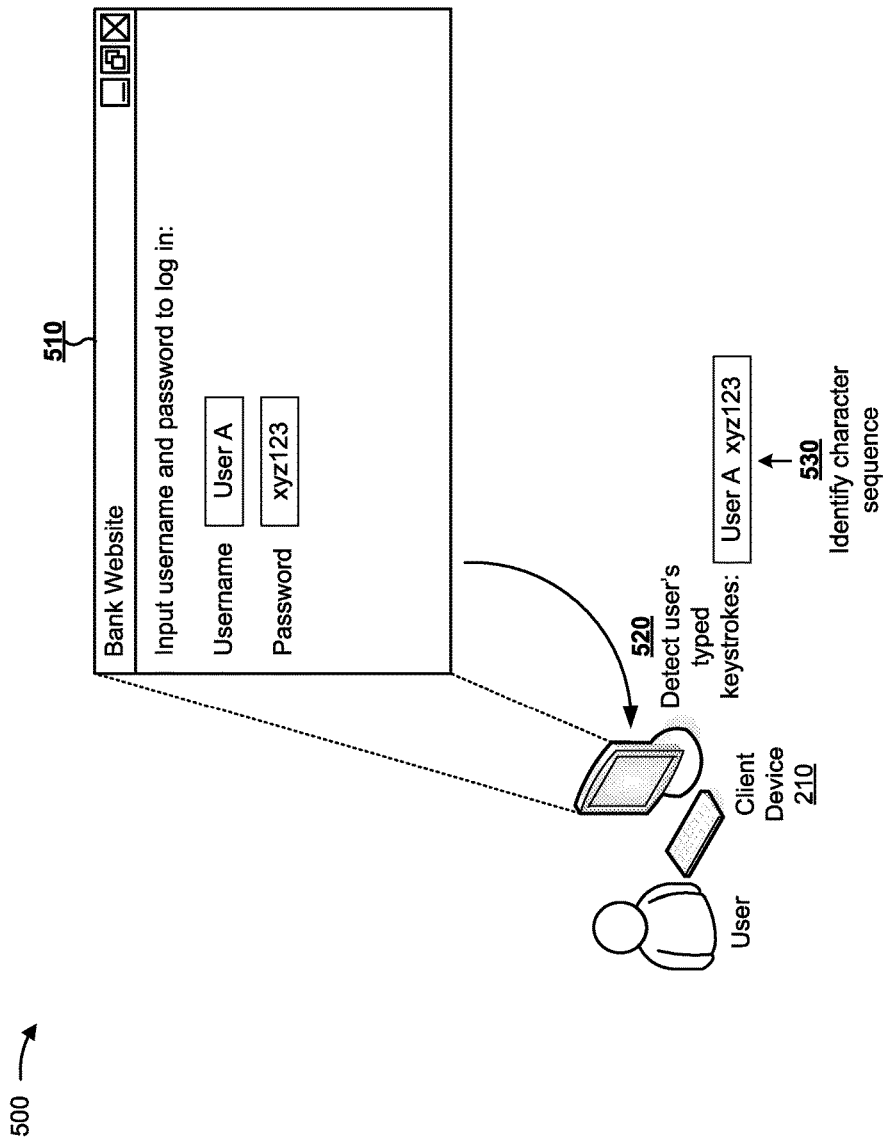
FIGS. 5A and 5B are diagrams of an example implementation relating to the example process shown in FIG. 4.
Figure 5B:
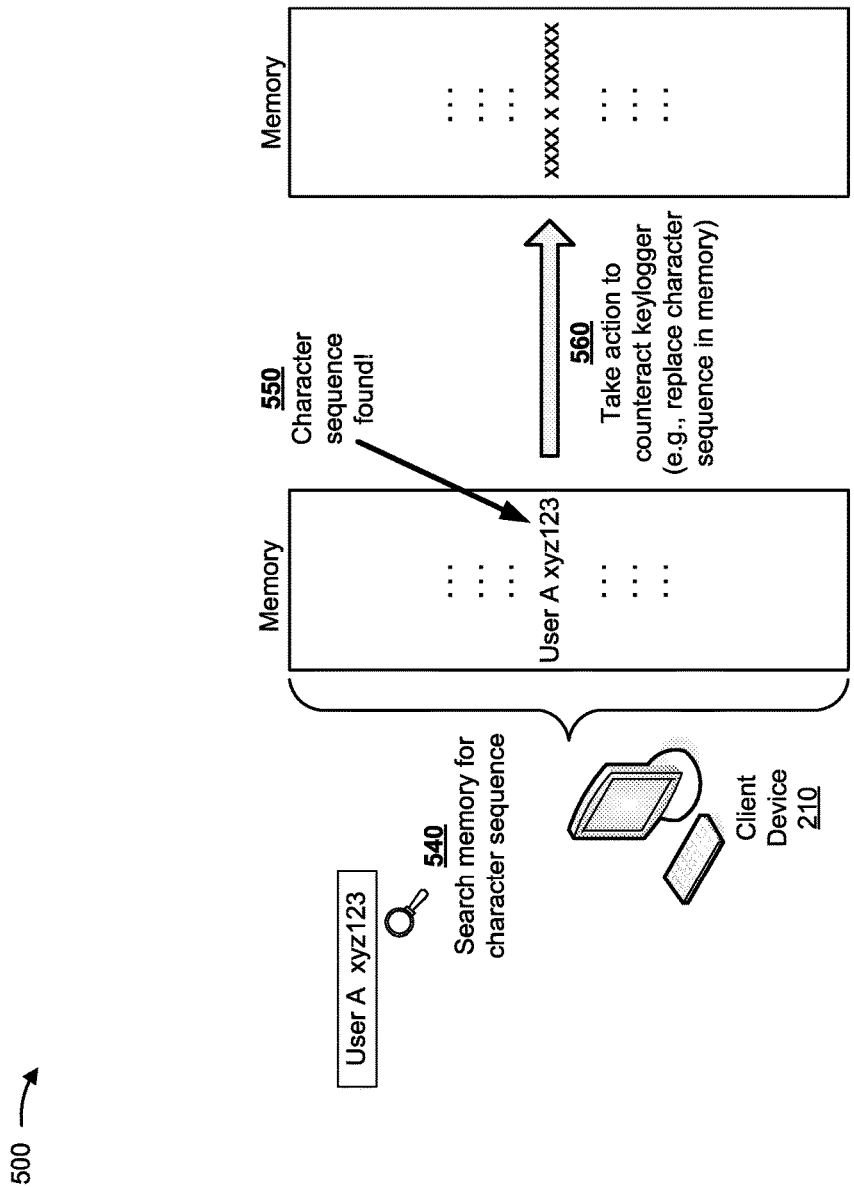

FIGS. 5A and 5B are diagrams of an example implementation 500 relating to example process 400 shown in FIG. 4. FIGS. 5A and 5B show an example of detecting a keylogger by detecting a sequence of keystrokes input by a user.

As shown in FIG. 5A, and by reference number 510, assume that a user interacts with client device 210 to navigate to a bank website using a web browser. As further shown, assume that the user inputs a username, shown as "User A," and a password, shown as "xyz123," to log in to the bank website. For the purpose of FIG. 5A, assume that client device 210 is executing a keylogger detection application for detecting a keylogger. As shown by reference number 520, using the keylogger detection application, assume that client device 210 detects the user's typed keystrokes of "User A" followed by "xyz123." As shown by reference number 530, assume that client device 210 identifies a character sequence corresponding to the keystrokes (e.g., a character sequence that includes "User A" and "xyz123").

As shown in FIG. 5B, and by reference number 540, assume that client device 210 searches a memory for the character sequence that includes "User A" and "xyz123." As shown by reference number 550, assume that client device 210 finds the character sequence in memory. Based on finding the character sequence, client device 210 determines that a keylogger is logging keystrokes of the user. As shown by reference number 560, client device 210 performs an action to counteract the keylogger. In this case, and as shown, assume that client device 210 replaces the character sequence (e.g., "User A xyz123") with another character sequence of the same length (e.g., "xxxx x xxxxxx"). In this way, client device 210 may detect and counteract the keylogger, such that the keylogger cannot send the character sequence corresponding to the input keystrokes (e.g., "User A xyz123") to a command and control server.

As indicated above, FIGS. 5A and 5B are provided merely as an example. Other examples are possible and may differ from what was described with regard to FIGS. 5A and 5B.

Figure 6A:
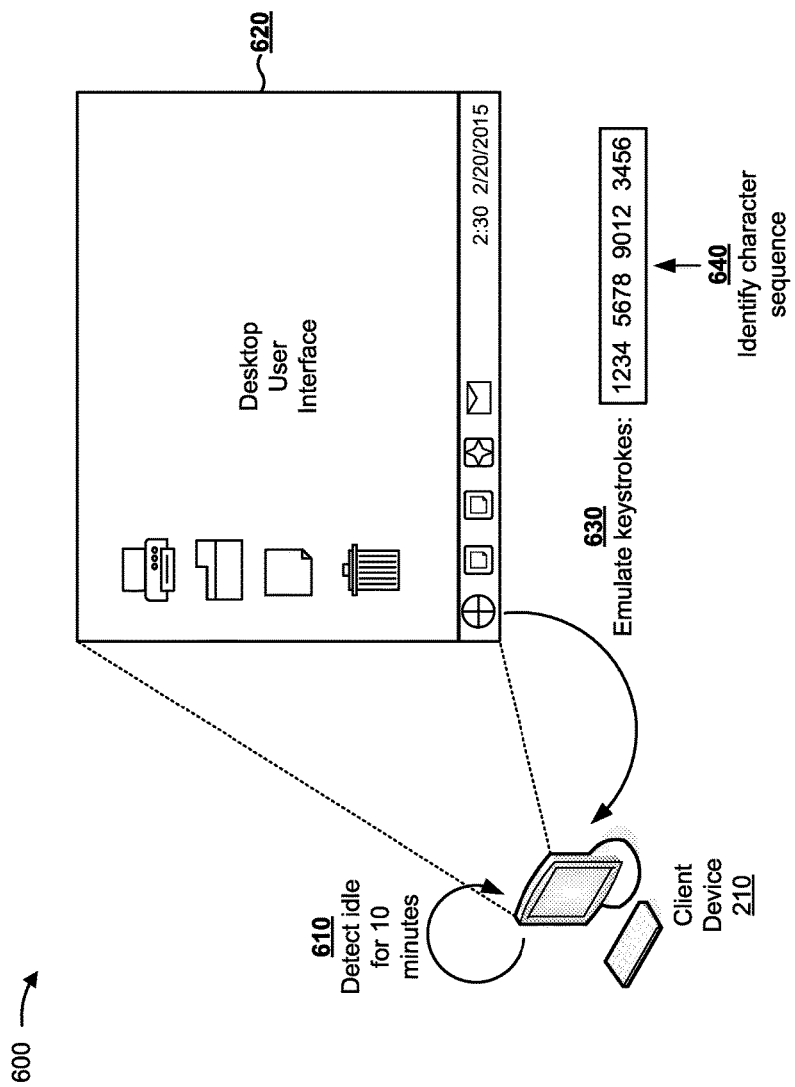
FIGS. 6A and 6B are diagrams of another example implementation relating to the example process shown in FIG. 4.
Figure 6B:
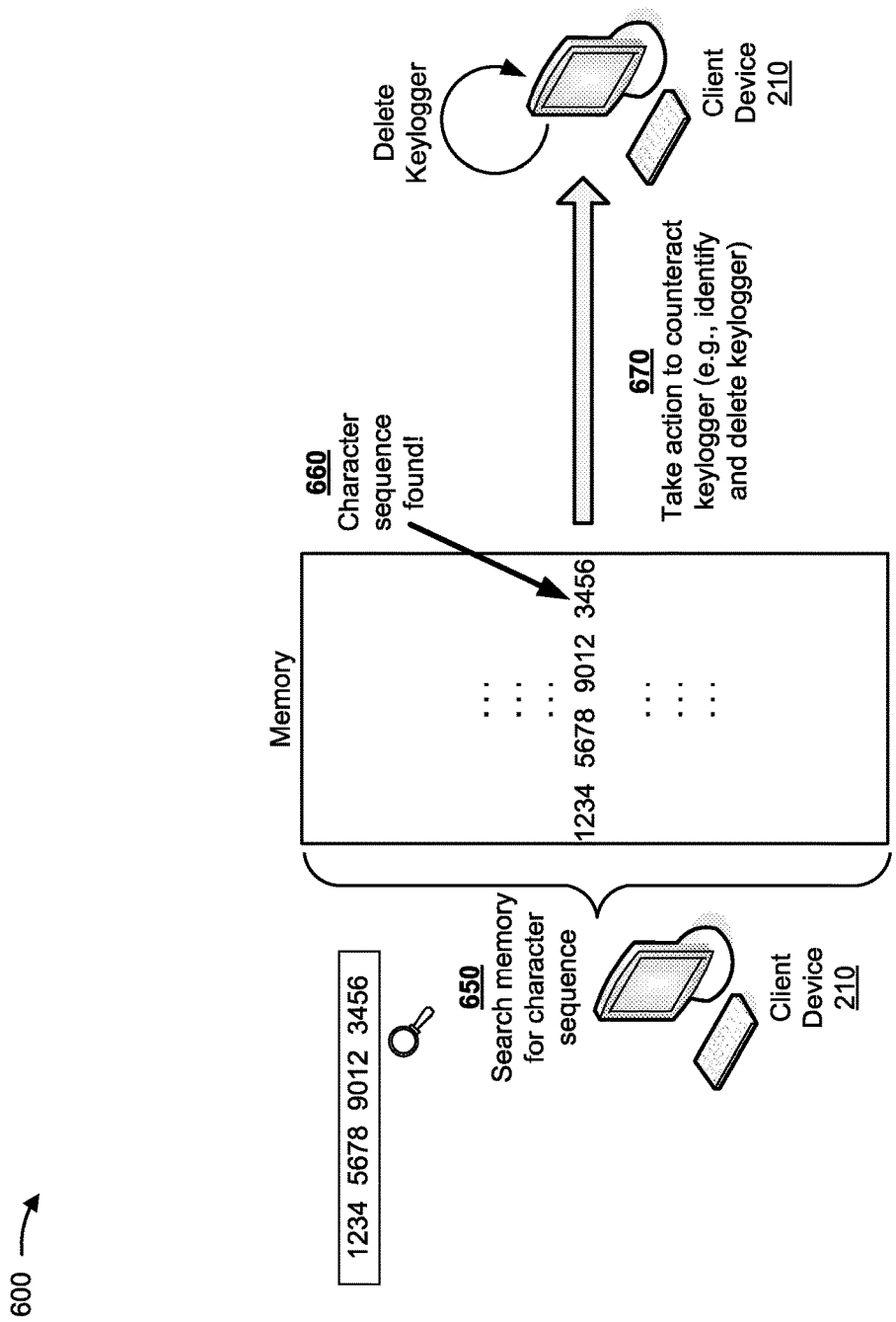

FIGS. 6A and 6B are diagrams of an example implementation 600 relating to example process 400 shown in FIG. 4. FIGS. 6A and 6B show an example of detecting a keylogger by emulating a sequence of keystrokes.

For the purpose of FIG. 6A, assume that client device 210 is executing a keylogger detection application for detecting a keylogger. As shown by reference number 610, assume that client device 210 (e.g., using the keylogger detection application) detects that the user has been idle for ten minutes (e.g., the user has not provided input to client device 210 for ten minutes). As shown by reference number 620, assume that client device 210 gives focus to a desktop user interface of client device 210, so as not to impact an application executing on client device 210 by emulating keystrokes in the application. As shown by reference number 630, assume that client device 210 emulates keystrokes of "1234 5678 9012 3456." Client device 210 may emulate these keystrokes based on a character pattern, such as a character pattern associated with a credit card number (e.g., to trigger a keylogger to log and/or store keystrokes). As shown by reference number 640, assume that client device 210 identifies a character sequence corresponding to the keystrokes (e.g., a character sequence that includes "1234 5678 9012 3456").

As shown in FIG. 6B, and by reference number 650, assume that client device 210 searches a memory for the character sequence that includes "1234 5678 9012 3456." As shown by reference number 660, assume that client device 210 finds the character sequence in memory. Based on finding the character sequence, client device 210 determines that a keylogger is logging keystrokes of the user. As shown by reference number 670, client device 210 performs an action to counteract the keylogger. In this case, and as shown, assume that client device 210 identifies and deletes the keylogger. For example, client device 210 may identify an application, associated with the memory location where the character sequence was found, as the keylogger. Client device 210 may then delete the keylogger. In this way, client device 210 may detect and counteract the keylogger.

As indicated above, FIGS. 6A and 6B are provided merely as an example. Other examples are possible and may differ from what was described with regard to FIGS. 6A and 6B.

Figure 7A:
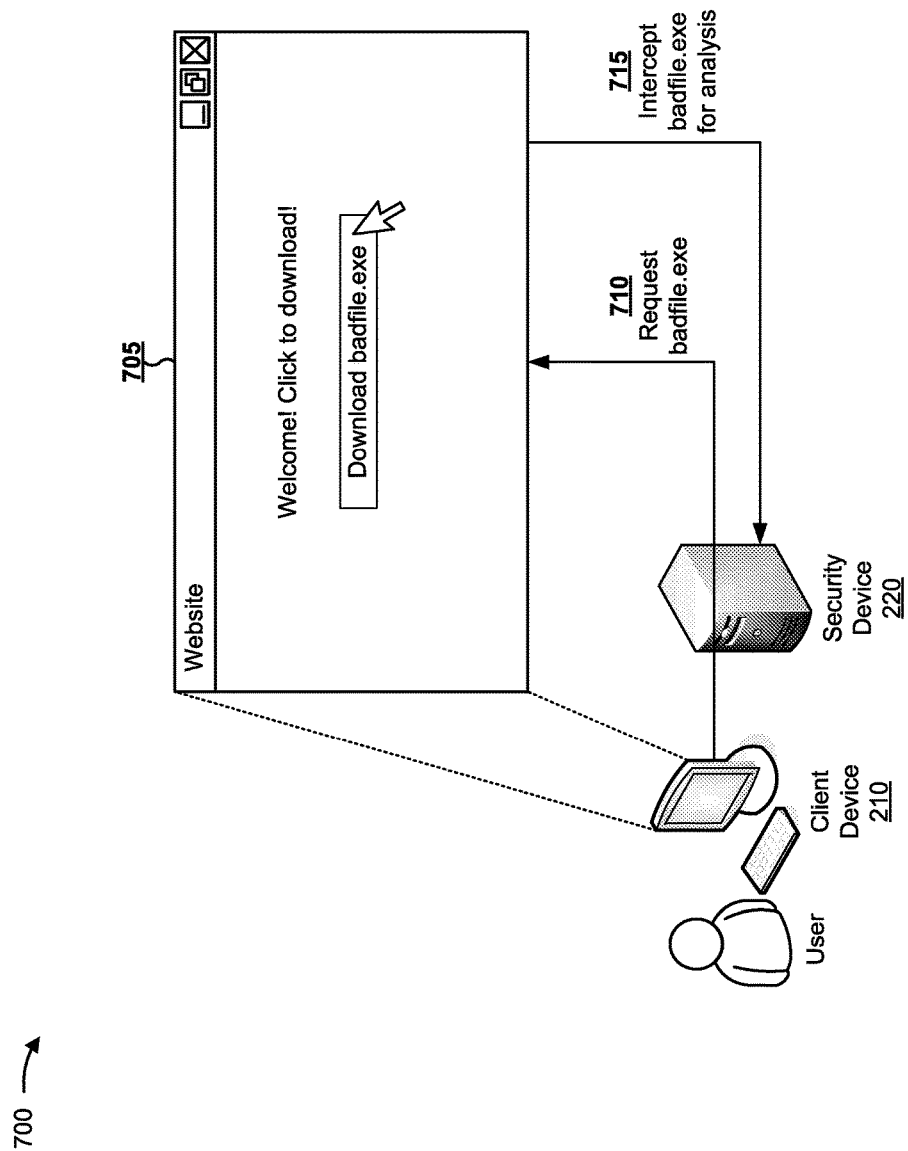
FIGS. 7A-7C are diagrams of another example implementation relating to the example process shown in FIG. 4.
Figure 7B:
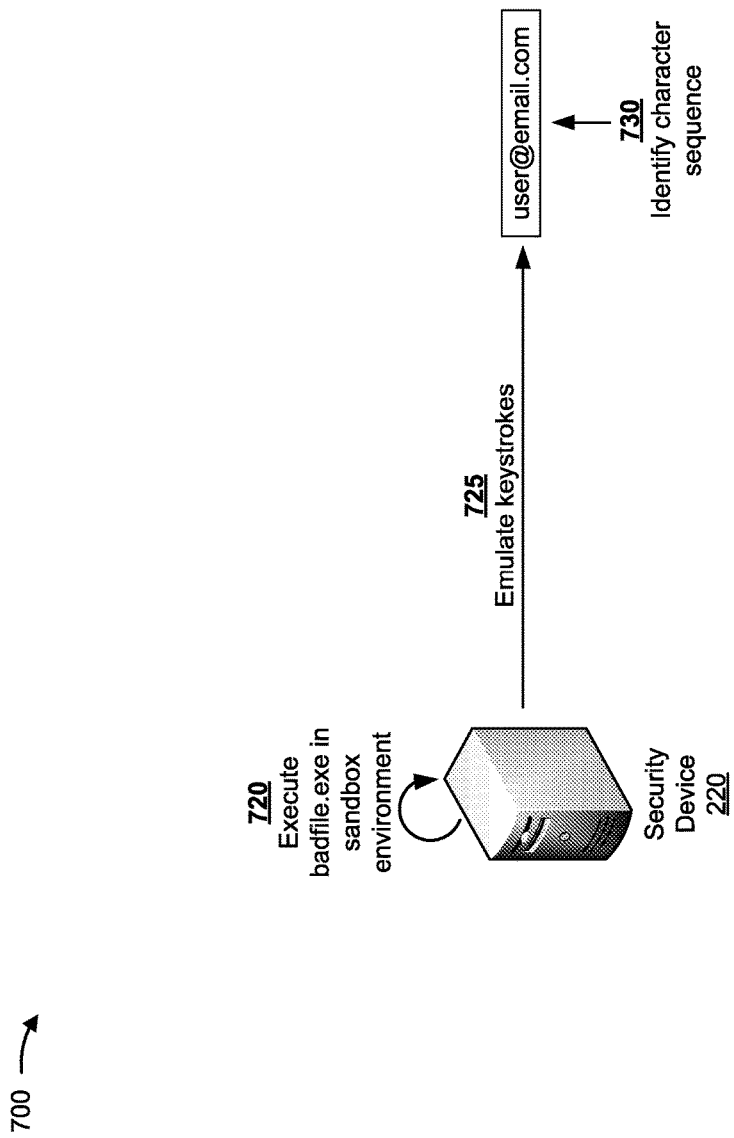
Figure 7C:
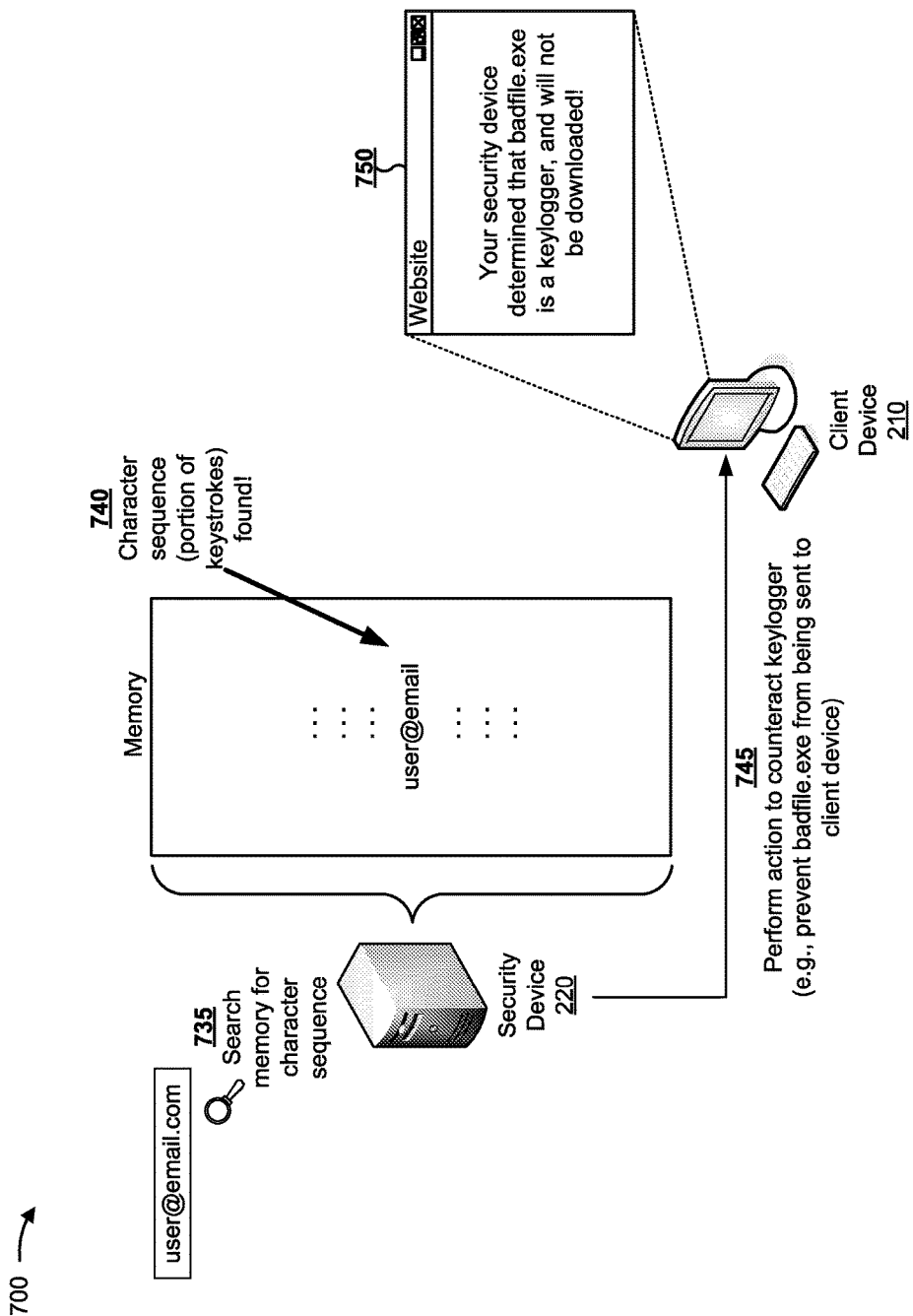

FIGS. 7A-7C are diagrams of an example implementation 700 relating to example process 400 shown in FIG. 4. FIGS. 7A-7C show an example of security device 220 detecting a keylogger and protecting client device 210 from downloading the keylogger.

As shown in FIG. 7A, and by reference number 705, assume that a user interacts with client device 210 to navigate to a website using a web browser, and to request a file, shown as "badfile.exe." As shown by reference number 710, assume that the request is routed from client device 210 to security device 220 before being routed to a web server associated with the website. As shown by reference number 715, assume that security device 220 receives (e.g., intercepts) the file for analysis before the file is provided to client device 210.

As shown in FIG. 7B, and by reference number 720, assume that security device 220 executes the file (e.g., "badfile.exe") in a sandbox environment executing on security device 220 to analyze files. Further, assume that security device 220 is executing a keylogger detection application (e.g., in the sandbox environment) for detecting a keylogger. As shown by reference number 725, assume that security device 220 (e.g., using the keylogger detection application) emulates keystrokes of "user@email.com." Security device 220 may emulate these keystrokes based on a character pattern, such as a character pattern associated with an email address (e.g., to trigger a keylogger to log and/or store keystrokes). As shown by reference number 730, assume that security device 220 identifies a character sequence corresponding to the keystrokes (e.g., a character sequence that includes "user@email.com").

As shown in FIG. 7C, and by reference number 735, assume that security device 220 searches a memory for the character sequence that includes "user@email.com." As shown by reference number 740, assume that security device 220 finds a portion of this character sequence in memory (e.g., "user@email"). In some implementations, security device 220 may search for a contiguous portion of the sequence of characters (e.g., "user@email"). In some implementations, security device 220 may search for a non-contiguous portion of the sequence of characters (e.g., "user email"). Based on finding the portion of the character sequence, security device 220 determines that a keylogger is logging keystrokes of the user. As shown by reference number 745, security device 220 performs an action to counteract the keylogger. In this case, and as shown, assume that security device 220 prevents the file (e.g., "badfile.exe") from being sent to client device 210. As shown by reference number 750, assume that security device 220 provides a message to client device 210 (e.g., via the web browser) that indicates that the file is a keylogger and will not be provided to client device 210. In this way, security device 220 may detect and counteract the keylogger, such that the keylogger is not executed on client device 210.

As indicated above, FIGS. 7A-7C are provided merely as an example. Other examples are possible and may differ from what was described with regard to FIGS. 7A-7C.

Implementations described herein may be used to detect a keylogger without monitoring network communications (e.g., which may be encrypted to prevent detection), and with little or no prior information about the keylogger, thus improving keylogger detection and conserving computing resources.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device for detecting keylogging, comprising:
a memory; and
one or more processors to:
    detect or emulate a sequence of keystrokes to be used to detect a keystroke logger application;
    determine a sequence of characters associated with the sequence of keystrokes,
        the sequence of characters corresponding to the sequence of keystrokes or a portion of the sequence of keystrokes;
    modify the sequence of characters to generate one or more modified sequences of characters via at least one of:
        an insertion of one or more characters in one or more locations of the sequence of characters, or
        a conversion of a character encoding scheme of the sequence of characters to another character encoding scheme;
    search outbound network traffic for the one or more modified sequences of characters;
    determine that the one or more modified sequences of characters is part of the outbound network traffic based on searching the outbound network traffic for the one or more modified sequence of characters; and
    perform an action to counteract the keystroke logger application based on determining that the one or more modified sequences of characters is part of the outbound network traffic.

2. The device of claim 1, where the one or more processors, when emulating the sequence of keystrokes, are to:
emulate a different sequence of keystrokes periodically.

3. The device of claim 1, where the one or more processors, when emulating the sequence of keystrokes, are to:
emulate the sequence of keystrokes periodically.

4. The device of claim 1, where the one or more processors are further to:
determine that a threshold amount of time has passed since a user input; and
where the one or more processors, when emulating the sequence of keystrokes, are to:
    emulate the sequence of keystrokes based on determining that the threshold amount of time has passed.

5. The device of claim 1, where the one or more processors are further to:
select a particular user interface; and
where the one or more processors, when emulating the sequence of keystrokes, are to:
    emulate the sequence of keystrokes based on selecting the particular user interface.

6. The device of claim 1, where the one or more processors are further to:
open a dummy user interface; and
where the one or more processors, when emulating the sequence of keystrokes, are to:
    emulate the sequence of keystrokes based on opening the dummy user interface.

7. The device of claim 1, where the one or more processors are further to:
navigate to a particular website; and
where the one or more processors, when emulating the sequence of keystrokes, are to:
    emulate the sequence of keystrokes based on navigating to the particular website.

8. A non-transitory computer-readable medium storing instructions, the instructions comprising:
one or more instructions that, when executed by one or more processors, cause the one or more processors to:
    detect or emulate a sequence of keystrokes to be used to detect a keystroke logger application;
    determine a sequence of characters corresponding to at least a portion of the sequence of keystrokes;
    modify the sequence of characters to generate one or more modified sequences of characters via at least one of:
        an insertion of one or more characters in one or more locations of the sequence of characters, or
        a conversion of a character encoding scheme of the sequence of characters to another character encoding scheme;
    search outbound network traffic for the one or more modified sequences of characters;
    determine that the one or more modified sequences of characters is part of the outbound network traffic based on searching the outbound network traffic for the one or more modified sequences of characters; and
    perform an action to counteract the keystroke logger application based on determining that the one or more modified sequences of characters is part of the outbound network traffic.

9. The non-transitory computer-readable medium of claim 8, where the one or more instructions, that cause the one or more processors to emulate the of keystrokes, cause the one or more processors to:
emulate the sequence of characters based on a pattern of characters.

10. The non-transitory computer-readable medium of claim 8, where the one or more instructions, when executed by the one or more processors, further cause the one or more processors to:
search a memory for the sequence of characters.

11. The non-transitory computer-readable medium of claim 8, where the one or more instructions, when executed by the one or more processors, further cause the one or more processors to:
search a memory location, associated with one or more applications that have been executed within a threshold period of time, for the sequence of characters.

12. The non-transitory computer-readable medium of claim 8, where the one or more instructions, that cause the one or more processors to modify the sequences of characters to generate the one or more modified sequences of characters, cause the one or more processors to:
apply an obfuscation technique to the sequence of characters to generate the one or more modified sequences of characters; and
where the one or more process, that cause the one or more processors to search the outbound network traffic for the one or more modified sequences of characters, cause the one or more processors to:
search the outbound network traffic for the one or more modified sequences of characters.

13. The non-transitory computer-readable medium of claim 12, where the one or more instructions, that cause the one or more processors to apply the obfuscation technique to the sequence of characters, cause the one or more processors to at least one of:
apply a ROT-13 substitution technique to the sequence of characters; or
XOR one or more characters, of the sequence of characters, with a particular byte.

14. The non-transitory computer-readable medium of claim 8, where the conversion of the character encoding scheme of the sequence of characters to another character encoding scheme comprises:
a conversion of the character encoding scheme of the sequence of characters from ASCII to UTF-8.

15. A method, comprising:
detecting or emulating, by a device, a sequence of keystrokes to be used to detect a keystroke logger application;
determining, by the device, a sequence of characters associated with the sequence of keystrokes,
the sequence of characters corresponding to the sequence of keystrokes or a portion of the sequence of keystrokes;
modifying, by the device, the sequence of characters to generate one or more modified sequences of characters by at least one of:
inserting one or more characters in one or more locations of the sequence of characters, or
converting a character encoding scheme of the sequence of characters to another character encoding scheme;
searching, by the device, outbound network traffic for the one or more modified sequences of characters;
determining, by the device, that the one or more modified sequences of characters is part of the outbound network traffic based on searching the outbound network traffic for the one or more modified sequences of characters; and
performing, by the device, an action to counteract the keystroke logger application based on determining that the one or more modified sequences of characters is part of the outbound network traffic.

16. The method of claim 15, further comprising:
searching in a file for the sequence of characters.

17. The method of claim 15, further comprising:
monitoring timing of changes to a memory based on detecting or emulating the sequence of keystrokes; and
determining that keylogging has occurred based on the timing of changes satisfying a threshold.

18. The method of claim 15, further comprising:
monitoring an amount of memory that is written to based on detecting or emulating the sequence of keystrokes; and
determining that keylogging has occurred based on the amount of memory satisfying a threshold.

19. The method of claim 15, further comprising:
monitoring processing activity based on detecting or emulating the sequence of keystrokes; and
determining that keylogging has occurred based on detecting the processing activity in relation to the sequence of keystrokes.

20. The method of claim 15, further comprising:
preventing the keystroke logger application from sending messages to another device.

* * * * *